May 9, 1950   C. J. HUGHEY   2,507,161
FILM GATE OPERATING MECHANISM
Filed Feb. 28, 1947
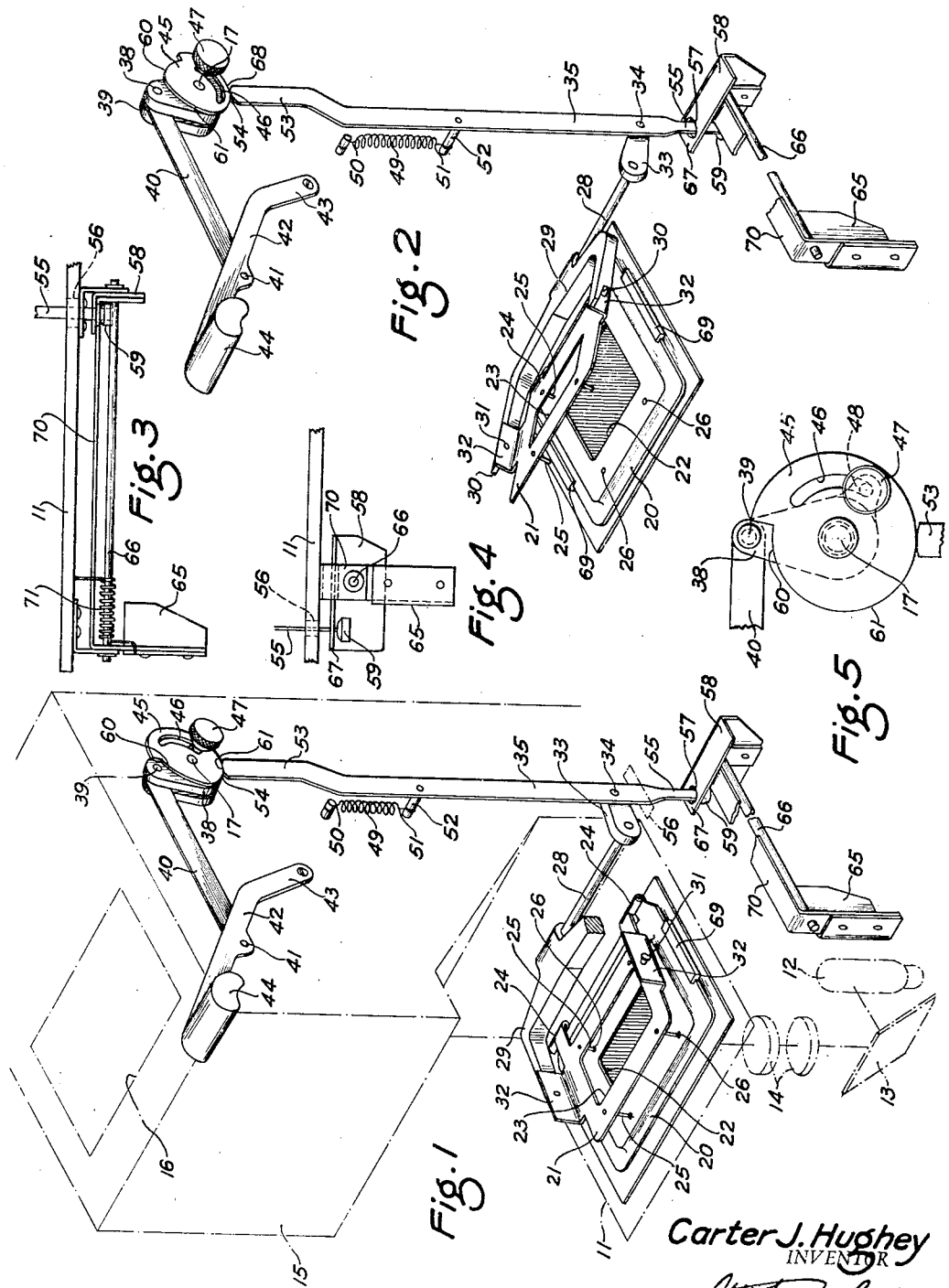
Carter J. Hughey
INVENTOR Patented May 9, 1950

2,507,161

UNITED STATES PATENT OFFICE 2,507,161

FILM GATE OPERATING MECHANISM

Carter J. Hughey, Rochester, N. Y., assignor to Eastman Kodak Company, Rochester, N. Y., a corporation of New Jersey Application February 28, 1947, Serial No. 731,688

3 Claims. (Cl. 88—24)

The present invention relates to projection printers of the general type as shown in the patent Schubert No. 2,143,800, issued January 10, 1939, and more particularly to a film gate operating mechanism for such a printer.

The present invention has as its principal object the provision of a film gate which is operatively connected to the paper platen moving means or mechanism so as to be operated in proper time relation therewith.

A still further object of the invention is the provision of an adjustable operating means for the gate by which the amount of gate opening may be varied or altered.

Yet another object of the invention is the provision of a dual mechanism for separately, independently, and selectively operating the gate.

And another object of the invention is the provision of a gate operating mechanism which is simple, rugged and effective in use.

To these and other ends, the invention resides in certain improvements and combinations of parts, all as will be hereinafter more fully described, the novel features being pointed out in the claims at the end of the specification.

In the drawings:

Fig. 1 is a perspective diagrammatic arrangement of a projection printer, showing the relation thereto of a gate-opening mechanism constructed in accordance with the present invention and with the mechanism adjusted to give one gate opening;

Fig. 2 is a view of the operating mechanism illustrated in Fig. 1 but adjusted to give a different and larger gate opening;

Fig. 3 is a side elevation view of the lower portion of Fig. 1, showing details of the knee lever operating mechanism for opening the gate;

Fig. 4 is a view taken from the left side of Fig. 3, showing the arrangement for connecting the knee lever to the operating link for the gate-opening mechanism; and Fig. 5 is a side elevation view of the adjustable cam for controlling the amount of gate opening.

Similar reference numerals throughout the various views indicate the same parts.

In Fig. 1 there is shown a diagrammatic arrangement of the projection printer of the type disclosed in the above-mentioned patent of Schubert. This printer has a top 11 which supports a film gate, to be later described, in which the film area to be printed is positioned and clamped. The printing light is supplied by a lamp 12 positioned below the top. The light rays from the lamp are directed by a mirror 13 and lenses 14 through an aperture, not shown, in the top 11 to the film area held in the gate. The image of the film area is then directed upwardly through a housing 15 to a projection aperture 16 formed on top of the housing, Fig. 1. When a print is to be made a sheet of sensitized paper is placed over the aperture 16 and a platen mechanism, not shown but of the type disclosed in the Schubert patent, is moved into engagement with the paper to hold the latter in position over the aperture 16 during the printing operation. At the completion of the printing time, the platen is elevated to permit the removal of the exposed paper. The platen is moved into an out-of-paper clamping position by means of an operating shaft 17 suitably journaled in the housing 15. The apparatus so far described does not form a part of the present invention, and a further detailed description is not deemed necessary to a full understanding of the present invention.

The film gate is placed on the top 11 over the aperture therein and comprises lower and upper rectangular members 20 and 21 formed with registering apertures 22 and 23 respectively. The gate members are hingedly connected along their rear edge 24. A pair of positioning pins 25 is arranged on each side of the aperture 23 of the upper gate member 21 and, when the gate is closed, extend into registering holes 26 on the lower gate member 20, as clearly shown in Fig. 1. When a film strip is fed through the gate, these pins engage the opposite side edges of the film, and guide the latter lengthwise through the gate to provide lateral registration of the film areas with the gate apertures 22 and 23, as is readily apparent.

A shaft 28 is mounted on the printer just above and to the rear of the gate and carries a yoke 29 having bifurcated ends 30 which are connected to pins 31 carried by upturned ears 32 formed on the upper gate member. Thus, rocking or rotation of the shaft 28 will similarly rock or rotate the yoke 29 to move the upper gate member 21 about the hinge 24 to open or close the gate, as will be readily understood from an inspection of the drawings. The right end of shaft 28 has secured thereto a crank 33, the free end of which is connected pivotally at 34 to a vertically movable link 35. It will be apparent that if the link 35 is moved downwardly, the shaft 28 will be rotated in a clockwise direction, as viewed from the right in Fig. 1, and the upper gate member 21 will be moved upwardly to open the gate. However, an upward movement of the link 35 will rotate the shaft 28 in a counter-clockwise direction to move the upper gate member 21 downwardly and into clamping relation with the lower gate member 20 to clamp the film image area therebetween, in a manner which is believed to be readily apparent to those in the art.

The gate should be opened whenever a film strip is being moved through or an image area is being positioned in the gate. During this operation, the platen will be in its elevated or inoperative position. When, however, the platen is moved to a paper clamping position, the film gate should be closed to clamp the film, for reasons well known in the art. In order to secure this result, the present invention provides an arrangement for connecting the film gate to the platen operating mechanism so that the opening and closing of the gate will be in proper relation to the movement of the platen.

To secure this result, the platen operating shaft 17 has mounted thereon a crank lever 38 which is pivotally connected at 39 to one end of an arm 40, the other end of which is pivoted at 41 to the mid-point of an operating member 42, one end 43 of which is pivoted to the side of the housing 15 while the other or free end carries an operating handle 44. It will be apparent that if the handle 44 is moved downwardly, a counter-clockwise rotation will be imparted to the shaft 17, as viewed from the right end of Fig. 1. Such rotation serves to move the platen downwardly to clamp the sensitized paper over the printing aperture 16. On the other hand, an upward movement of the handle 44 rocks the shaft 17 clockwise and this movement serves to lift the platen to an elevated or inoperative position and out of contact with the exposed paper to permit the latter to be removed.

The shaft 17 has mounted loosely on the free end thereof a cam 45 formed with an arcuate slot 46 through which projects a clamping screw 47 threaded into an extension 48 formed on the crank lever 38. When the screw 47 is backed off, the cam 47 may be turned relative to the shaft 17 to the position in Fig. 1, or to position shown in Fig. 2, the purposes of which adjustment will be later pointed out. When the cam has been thus adjusted, the screw 47 is turned in to clamp the cam, and to operatively connect the cam to the shaft 17 so as to turn as a unit therewith. A spring 49 has one end 50 anchored to the housing 15 and the other end 51 connected to a pin 52 carried by the link 35. This spring tends to move the link 35 upwardly to bring the upper end 53 into engagement with the surface 54 of the cam 45. The lower end 55 of the link 35 is reduced in size and extends through an opening 56 in the top 11 and through a registering hole 57 in a rockable member 58 positioned below the top 11 and to be later more fully described. The lower end of lever 35 is provided with a button or enlargement 59 of a size greater than the hole 57.

When the cam 45 is in the position shown in Fig. 1, it will be apparent that when the shaft 17 is rocked in a counter-clockwise direction by the downward movement of the handle 44, the cam 45 will be similarly rotated to bring the smaller radius portion 60 of the cam surface 54 into registry with the upper end 53 of the link 35. As the latter is held in contact with the cam by reason of the spring 49, such movement of the cam will result in an upward movement of the link 35. Such movement will rock shaft 28 in a counter-clockwise direction to move the upper gate member 21 downwardly and into clamping relation with the lower gate member 20. Thus when the platen is moved to the paper clamping position, the gate is closed. When, however, the handle 45 is raised, the shaft 17 is rocked clockwise to elevate the platen and turn the cam 45 to the position shown in Fig. 1. Such turning of the cam moves the larger radius portion 61 of the cam into engagement with the end 53 of the link 35 to move the latter downwardly to thus rock shaft 28 in a clockwise direction to open the gate to the position shown in Fig. 1.

By means of the above-described mechanism, the platen is operatively connected to the gate so that the opening and closing of the gate is in proper relation to the movement of the platen.

The relation of the parts is such, see Fig. 1, that when the platen is in its elevated position, the gate will remain slightly opened to facilitate sliding of a film strip therethrough to bring an image area of the strip into position in the gate and into registry with the gate apertures 22 and 23. In such a position, the front pair of pins 25 project slightly into the front pairs of holes 26, as clearly illustrated in Fig. 1. With the gate parts so arranged, it will be found difficult to insert a strip of film in position between the gate members. Therefore, it is desirable, when a strip of film is to be placed initially in the gate, to open the latter wider and beyond the position shown in Fig. 1 and to a position somewhat like that shown in Fig. 2 in which the front pins 25 are completely withdrawn from the front holes 26. With the gate thus opened, the film strip may be readily and easily inserted in the gate.

To secure this result, the present invention provides a means separate and independent from the shaft 17 for affording a further separation of the gate parts. This means comprises a knee lever 65 secured to or formed integral with one leg of a channel or U-shaped member 70, the other leg of which is connected to the member 58 which, preferably, is an angle iron the horizontal leg of which is formed with the hole 57. The member 70 is mounted loosely on shaft 66 so that movement of the knee lever 65 will rock the members 58 and 70 as a unit about shaft 66. Referring now to Fig. 1, when the knee lever 65 is moved to the right, the members 58 and 70 rock in a counter-clockwise direction about shaft 66 to move the left end 67 of the member 58 downwardly. This movement will bring the horizontal leg of the member 58 into engagement with the button or enlarged end 59 of link 35 to move the latter downwardly to disengage the upper end 53 from contact with the cam 45 and to rock shaft 28 clockwise to raise the upper gate member 21 away from the lower gate member 20. Thus the gate is opened independently of the shaft 17 and the platen moving mechanism. Also, the parts are so arranged that such movement by the knee lever will impart a sufficient rotation to the shaft 28 to open the gate members wider than shown in Fig. 1 to permit the ready insertion of a film strip in the gate. Upon release of the knee lever, the spring 49 returns the parts automatically to the position shown in Fig. 1 in which the gate is opened slightly to permit the easy movement of the film strip therethrough. A coil spring 71 wrapped around the shaft 66 and connected to the top 11 and knee lever 65 assists in the return of the parts. Thus the gate may be opened either by the rotating in the shaft 17 and the platen operating mechanism, or by the members 58 and 70 which are under the control of the knee lever 65.

While the gate opening shown in Fig. 1 is admirably adapted in connection with use of film strips, it is not suitable when separate image areas, cut from a strip, are to be inserted in the gate. In order to adapt the gate opening to use with separate image areas, screw 47 is first backed off to release cam 45, and the latter is turned relative to the shaft, by means of the slot 46, from the position shown in Fig. 1 to the position shown in Fig. 2, whereupon the screw is again adjusted to again clamp the cam. Such adjustment of the cam will move a portion 68 thereof into engagement with the upper end 53 of the link 35 and cause a downward movement of the latter. This movement will impart a sufficient clockwise rotation of the shaft 28 to move the upper gate member 21 to the position shown in Fig. 2, from which the front guide pins 25 are completely withdrawn and spaced vertically from the registering holes 26. Also the end 59 of the link 35 is moved out of contact with member 58 to render the knee lever inoperative. In this position of the gate parts, a single image area may be readily placed in position between the gate members. In order to hold this area in position until the gate is finally closed, the lower gate member 20 may have positioned thereon just back of the aperture 22 a small spring clip under which the rear edge of the film may be inserted. As the spring clip does not constitute a part of the present invention it is not illustrated, but it is believed that the structure of such a holding clip will readily suggest itself to any mechanic.

When the handle 44 is moved downwardly to move the platen into clamping relation with the paper, the link 35 is also moved downwardly, as explained in connection with Fig. 1, to close the gate to clamp the single film area. However, as the gate is opened wider, a greater downward movement must be imparted to link 35 when the gate is in the position shown in Fig. 2. The pitch of the cam surface 54 is such as to accomplish this additional movement of the link.

The present invention thus provides a gate operating mechanism by which the gate may be opened and closed by the platen operating mechanism and in proper relation thereto. Also the gate may be opened independently of the platen mechanism by movement of the knee lever 65. Thus two separate, distinct and independent means are provided for opening the gate. In all cases, however, the platen operating mechanism is used to close the gate. When the gate is opened to the position shown in Figs. 1 and 2, the bifurcated ends 30 of the yoke 29, and the pins 31 in the upper gate member moves through an arcuate path. Such movement serves to slide the entire gate forward on the top 11 to facilitate handling of the film. The further the gate is opened the further the forward movement, so that when the gate is opened to the position shown in Fig. 2 to insert a separate image area, the gate is moved to its furthest forward position, the advantage of which will be readily apparent. In order to retain the gate in its proper position on the top 11, during the sliding movement, guide clips 69 are mounted on the top 11 and engage the bottom gate member 20 so that the gate will move in a straight line and will return to its proper position on top 11 when the gate is closed.

While certain embodiments of the invention have been disclosed, it is to be understood that the inventive idea may be carried out in a number of ways. This application is, therefore, not to be limited to the precise details described, but is intended to cover all variations and modifications thereof falling within the scope of the appended claims.

I claim:

1. Gate operating means for a film gate of a projection printer comprising, in combination, a movable platen, a platen operating shaft, means for rotating said shaft in opposite directions to move said platen to and from open position, means for connecting said shaft to said gate so that rotation of said shaft in opposite directions will open and close said gate, and a lever normally disconnected from said gate but selectively connectable thereto both to disconnect the gate from said shaft and to vary the opening of said gate independently of said shaft.

2. Gate operating means for a film gate of a projection printer comprising, in combination, a movable platen a platen operating shaft, means for rotating said shaft in opposite directions, means for operatively connecting said shaft to said gate so that rotation of said shaft in one direction will close said gate to clamp an image area therein and rotation of the shaft in the opposite direction will open said gate to permit the image area to be positioned therein, and means associated with said connecting means for varying the amount of opening of said gate, a rockable, knee-operated lever independent of said shaft and normally disconnected from said gate, and means operative upon rocking said lever in one direction to connect said lever to said connecting means to move the latter to disconnect the gate completely from said shaft and simultaneously to connect the lever to said gate to adjust the opening thereof independent of said shaft.

3. Gate opening means for a film gate of a projection printer comprising, in combination, a platen operating shaft, means for rotating said shaft, an adjustable member carried by said shaft, means including a link releasably connectable to said member for operatively connecting said gate to said shaft so that rotation of said shaft in one direction will open said gate to permit a film area to be positioned therein but rotation of the shaft in the opposite direction will close said gate to clamp said area therein, said member being adjustable to control the amount said gate may be opened, a rockable lever normally disconnected from said link, and means operative upon rocking said lever in one direction to connect the lever to said link to move the latter in one direction to disconnect the link and gate completely from said shaft and simultaneously to connect the lever to said gate to adjust the opening of the gate independently of said shaft.

CARTER J. HUGHEY.

REFERENCES CITED

The following references are of record in the file of this patent:

UNITED STATES PATENTS

| Number | Name | Date |
|---|---|---|
| 1,808,274 | Webster | June 2, 1931 |
| 1,914,461 | Rodman | June 20, 1933 |
| 2,107,867 | Mayer | Feb. 8, 1938 |
| 2,123,510 | Leitz | July 12, 1938 |
| 2,124,954 | Pirmov | July 26, 1938 |
| 2,158,903 | Knobel | May 16, 1939 |
| 2,168,190 | Busse | Aug. 1, 1939 |